United States Patent [19]

Wallace

[11] Patent Number: 4,556,694

[45] Date of Patent: Dec. 3, 1985

[54] LOW TEMPERATURE FLEXIBLE PVC BLENDS

[75] Inventor: Lawrence R. Wallace, Ponca City, Okla.

[73] Assignee: E. I. Du Pont de Nemours and Company, Wilmington, Del.

[21] Appl. No.: 634,721

[22] Filed: Jul. 26, 1984

[51] Int. Cl.[4] .................... C08L 23/34; C08L 23/28; C08L 27/06

[52] U.S. Cl. .................................... 525/239; 525/192

[58] Field of Search ........................ 525/240, 239, 192

[56] References Cited

U.S. PATENT DOCUMENTS

| | | | |
|---|---|---|---|
| 3,006,889 | 10/1961 | Frey et al. | 525/239 |
| 3,165,560 | 1/1965 | Frey et al. | 525/239 |
| 3,467,732 | 9/1969 | Schnebelen et al. | 525/239 |
| 3,940,456 | 2/1976 | Frey et al. | 525/239 |
| 4,113,805 | 9/1978 | Frey et al. | 525/239 |
| 4,280,940 | 7/1981 | Klug et al. | 525/239 |

Primary Examiner—Carman J. Seccuro
Attorney, Agent, or Firm—Cortlan R. Schupbach

[57] ABSTRACT

Low temperature impact properties of poly(vinyl chloride) are improved by adding to the poly(vinyl chloride) chlorosulfonated polyethylene and chlorinated polyethylene wherein the base polyethylene of each additive has a density of at least 0.94. The use of all three components provides a synergistic lowering of the brittleness temperature as compared to either chlorosulfonated polyethylene or chlorinated polyethylene when added to the poly(vinyl chloride).

8 Claims, No Drawings

LOW TEMPERATURE FLEXIBLE PVC BLENDS

This invention relates to improved low temperature impact resistant poly(vinyl chloride) blends with chlorosulfonated polyolefins and chlorinated polyolefins. More specifically, this invention relates to a synergistic lowering of brittleness temperature of poly(vinyl chloride) when blended with chlorosulfonated high density polyethylene and chlorinated high density polyethylenes.

Poly(vinyl chloride) is widely used in many industrial fields. It contains various disadvantages so as to render difficult or even impossible the use of poly(vinyl chloride)-based materials for certain purposes. These effects are widely known and many attempts have been made to modify the properties of poly(vinyl chloride).

Many modifications to poly(vinyl chloride) have been made to transform hard poly(vinyl chloride) into a softer, less brittle material. These processes are generally divided into external plasticizing processes, which are carried out by means of innumerable plasticizers known, recommended and used for these purposes and by internal plasticizing, wherein various other polymers are blended or combined with poly(vinyl chloride) homopolymers or copolymers. Whichever method is carried out, considerable disadvantages have remained. For example, when using external plasticizers, the extractability and tendency of the plasticizer to travel has been pronounced, in addition to a general decrease in either weathering or heat-aging characteristics of poly(vinyl chloride). When using internal plasticizers such as copolymers, the advantages obtained by using such materials often entails the loss of dimensional stability and the like.

One particular disadvantage of poly(vinyl chloride) which has long been known is the extreme brittleness of the unmodified material. It has long been known to modify poly(vinyl chloride) by adding high polymeric natural and synthetic substances. For example, vinyl chloride polymers are frequently plasticized with plasticizers which can migrate from the composition with age, particularly at elevated temperatures. It is known, as taught in U.S. Pat. No. 3,209,055, that halogenated, particularly chlorinated and sulfochlorinated polyethylenes can be mixed with vinyl chloride polymers to give flexible thermoplastic compositions which do not require the use of plasticizers. The use of both chlorinated polyethylenes and chlorosulfonated polyethylenes in polymers of vinyl chloride and certain synergistic strength results obtained therefrom are set forth in U.S. Pat. No. 3,006,889. However, while certain strength results were greatly increased it was noted that a blend containing all three components i.e. post-chlorinated poly(vinyl chloride), chlorinated polyethylene (CPE) and chlorosulfonated low pressure polyethylene resulted in a decrease in notch bar impact strength, an impact test which is directionally the same as the ASTM brittleness temperature test (ASTM D 746) normally used for non-rigid polymers. Thus it can be seen that use of all three components have in the past entailed certain disadvantages with respect to the low temperature impact properties of such blends.

Poly(vinyl chloride) art abounds with references dealing with blends of poly(vinyl chloride) and chlorinated polyethylene, or poly(vinyl chloride) and chlorosulfonated polyethylenes (CSM). Representative but far from exhaustive of the references available in the area include German Pat. No. 1,111,383, which teaches a high impact molding composition based on post-chlorinated vinyl chloride copolymers produced by adding 10 to 50% of chlorinated and/or chlorosulfonated products of high polymeric aliphatic hydrocarbons such as polyethylene to the post chlorinated polymers. Japan Kokai 56-17255 relates to manufacturing products coated with flame retarding chlorinated rubber comprising 15 to 80 weight percent chlorine such as chlorinated polyethylene, chlorosulfonated polyethylene and PVC. U.S. Pat. No. 3,459,591 taught producing heat sealable gas and vapor impermeable films by applying a coating on at least one surface of the film comprising a homopolymer or copolymer of vinylidene chloride or vinyl chloride together with a chlorinated or chlorosulfonated polyolefin having a crystalline structure. U.S. Pat. No. 3,006,889 teaches the use of a blend of post-chlorinated polyvinylchloride, chlorinated polyethylene and chlorosulfonated polyethylene as set forth in Example 9. U.S. Pat. No. 3,209,055 shows polymeric blends of vinyl chloride polymer with chlorinated or sulfochlorinated polyethylene which are crosslinked to improve resistance to heat distortion. U.S. Pat. No. 3,396,211 describes compositions of vinyl chloride and randomly chlorinated polyethylene as an impact modifier for rigid poly(vinyl chloride) compositions.

It is not recognized in the art, however, that a solution is possible to the loss of low temperature properties which are normally encountered when combining chlorinated polyethylene, chlorosulfonated polyethylene, or mixtures of these with poly(vinyl chloride). As set forth in U.S. Pat. No. 3,006,889, the notch bar impact test as set forth in Example 9 shows a loss in impact strength when a combination of chlorosulfonated polyethylene and chlorinated polyethylene are used as compared to Example 8 utilizing only chlorinated polyethylene as a modifier.

It would therefore be of great benefit to provide a method for obtaining the benefits of poly(vinyl chloride) blends while simultaneously avoiding the previously encountered detrimental low temperature impact properties of this material, thereby opening entire new fields of use for such blends.

I have now discovered that the low temperature properties of poly(vinyl chloride) blends with halogenated olefinic polymers can be improved by utilizing blends of poly(vinyl chloride) together with from 1 to 50 parts of chlorosulfonated polyolefins wherein said polyolefin has a density of at least 0.94 and from 1 to 50 parts of a chlorinated polyolefin such as a chlorinated polyethylene wherein said base polyolefin such as polyethylene has a density of at least 0.94, and wherein the total amount of chlorinated polyethylene (CPE) and chlorosulfonated polyethylene (CSM) does not exceed 60% of the polymer present.

It should be emphasized that while the instant invention is directed to improving the low temperature impact properties of poly(vinyl chloride), that poly(vinyl chloride) need not form the majority of the polymer of the present invention in order to obtain the advantages of poly(vinyl chloride) (such as increased tensile strength) while simultaneously obtaining low temperature properties.

For the purposes of the present invention, poly (vinyl chloride) is solid poly(vinyl chloride) having a high molecular weight, including copolymers of vinylchloride with other ethylenically unsaturated monomers, provided only that the vinyl chloride is the principle component comprising at least 50% by weight of the vinyl chloride mixture. Thus the term "vinyl chloride" as used herein includes the homopolymer poly(vinyl chloride) and copolymers thereof with other ethylenically unsaturated monomers, representative examples of which are described in U.S. Pat. No. 3,006,889.

The poly(vinyl chloride) or PVC can be produced by any suitable polymerization method with a suspension type resin being the preferred choice. PVC based copolymer may also be utilized. The molecular weight or inherent viscosity of the PVC, as measured by ASTM Test Method D 1243-66T (Method A), ranges from about 0.60 to about 1.30. The poly (vinyl chloride) can be post-chlorinated if desired.

Chlorosulfonated polyethylene as used in this specification and claims is intended to represent a group of synthetic elastomers which can be derived from the reaction of a mixture of chlorine and sulfur dioxide on any of the various plastic polyolefins such as polyethylenes. The product of this reaction or any other suitable reaction, is a chemically modified form of the original polyethylene (or other olefin) homopolymer or copolymer with at least one other olefin containing up to 10 carbon atoms and contains in general from 5 to 57%, preferably from 20 to 50% chlorine and from about 0.1 to about 3 weight percent sulfur, yielding a saturated chlorohydrocarbon elastomer having sulfonyl chloride functions along the polyethylene backbone. The chlorosulfonated polyethylene (CSM) polymers described in the present invention are derived from high density linear polyethylene having a density of at least 0.94 which are then chlorosulfonated to provide a chlorine content of from about 20 to about 50% by weight and a sulfur content of from about 0.1 to about 3 weight percent sulfur.

The term "chlorinated polyethylene" (CPE) as used in this specification and claims is a substantially linear high density polyethylene homopolymer or copolymer with at least one other olefin that can contain up to 10 carbon atoms, having a density of at least 0.94 and having a chlorine content of from about 35 to about 50% by weight after chlorination. These materials are described in U.S. Pat. No. 3,396,211, hereby incorporated by reference into this specification. It is preferred that chlorinated polyethylene be a non-randomly chlorinated polyethylene, which is descriptive of the manner in which the compound is prepared and refers to the random distribution of chlorine atoms along a given polymer chain of polyethylene wherein all halogen atoms are equally likely to be replaced by chlorine atoms. However, either type of chlorinated polyethylene is effective in the present invention.

In carrying out the process of the present invention, the relative amounts of chlorinated polyethylene or chlorosulfonated polyethylene which can be added to poly(vinyl chloride) to improve low temperature impact ranges from about 1 to about 50 parts of each material, but from about 2 to about 30 parts are preferred and from about 5 to about 25 parts are most preferred. Further, it has been suprisingly found that when these materials are utilized in approximately equal proportions, a synergistic effect is obtained in the lowering of brittleness temperature. When PVC is plasticized with either material alone, and when such polyethylene is high density polyethylene as described in the instant specification, a greater lowering of the brittleness temperature is seen when both materials are used with PVC as compared to the use of either CPE or CSM alone with PVC at equivalent ratios. (Table 1)

The compositions of the present invention are prepared utilizing conventional machinery used in the rubber and plastic industries. Normally, it is desirable to mix the vinyl chloride polymer with chlorinated polyethylene and chlorosulfonated polyethylene in the presence of a thermal stabilizer to prevent degradation of polymer properties at processing temperatures, and in the presence of a lubricant to prevent adherence to the processing machinery. However, such materials need not be used if sufficient care is utilized to maintain polymer properties. Normally, such materials will be used in minor amounts in order to enhance processing speed and reproduceability.

The molecular weight of the base polyethylene in in chlorinated polyethylene and chlorosulfonated polyethylene has an effect on the lowering of the brittleness temperature. I have discovered that CPE and CSM polymers having a high molecular weight in the base polyethylene as represented by $MI_{20}$ values (determined by ASTM D 3364) of less than 5, provide a surprising lowering of the brittleness temperature. This is distinctly surprising since the tendency of very high molecular weight polyethylenes to become increasingly brittle at lowered temperatures is well known.

Subsequent to forming the polymer blends of the present invention, the poly(vinyl chloride) material can thereafter be blended in accordance with procedures known in the art and can contain stabilizers, blowing agents, fillers, cross-linking agents and the like.

Thus the materials of the present invention are physical blends of polymers that require no cross-linking or vulcanization and produces inherently flexible polymer blends that can be tailored for many end use applications. Various ratios of the materials of the present invention produce polymer blends having excellent abrasion resistance, dimensional stability, electrical properties, weathering resistance, and especially low temperature impact properties. The instant invention is likewise superior for electrical insulation properties, since the plasticizers normally detrimental to both electrical properties and heat ageing characteristics are not necessary.

Stabilizers useful for the instant invention are those that are suitable in the end use applications. In general, stabilizers may be chosen which do not readily cause vulcanization of sulfonyl chloride groups present in the chlorosulfonated polyethylene (CSM) and may include metal salts and/or organic chelating agents and/or acid scavengers and/or anti-oxidants. Representative but non-exhaustive examples of such stabilizers are described in *Vinyl and Allied Polymers*, George Matthews, Volume 2, Chapter 5, pages 62 through 86. Concisely, these materials include metal salts such as tribasic lead sulfate or dibasic lead phthalate, barium, cadmium, or tin complexes, organic chelating agents such as tri(nonyl-phenyl) phosphite, triphenylphosphite, or bis-(2,4-di-t-butylphenyl) pentaerythritol diphosphite. Acid scavengers such as epoxidized soya oil, magnesium oxide, lead oxide or other numerous epoxy resins can likewise be used. Antioxidants which stabilize against antioxidation can likewise be used in the instant blends.

The invention is more concretely described with reference to the examples below wherein all parts and percentages are by weight unless otherwise specified. The examples are provided to illustrate the present invention and not to limit it.

EXAMPLES 1-6

Ternary blends were prepared utilizing a standard test formula containing only polymer(s), stabilizers and lubricants. The formula is based on parts per hundred total polymer content:

| Polymer(s) | 100 |
|---|---|
| Dibasic lead phosphite | 5 |
| Lubricants* | 3 |

*(1.5 phr polyethylene wax 0.5 phr partial fatty acid esters 1.0 phr calcium stearate)

The lubricants used were polyethylene wax AC6A, (trademark of and sold by Allied Chemical Company), partial fatty acid esters (sold as Loxiol HOB 7121, trademark of and sold by Henkel Chemical Corporation), and calcium stearate.

In all tests carried out, the poly(vinyl chloride) utilized was Conoco 5265 PVC resin, (trademark of and sold by Conoco Chemical Company) having an I.V. of 0.68. The chlorinated polyethylene utilized was DuPont HPR 5857, (trademark of and sold by E. I. DuPont de Nemours and Company), containing 43 weight percent chlorine. The chlorosulfonated polyethylene utilized was Hypalon ® 40 CSM (trademark of and sold by E. I. DuPont de Nemours and Company). The blends were prepared by hand mixing the ingredients and milling at 340° F. on a 2-roll steam mill to ensure adequate mixing or compounding. Appropriate test specimens were then compression molded at 340° F. The tests were all conducted following ASTM methods as noted:

|  | ASTM Test Method |
|---|---|
| Hardness Durometer, initial | D 2240 |
| Specific Gravity | D 792 |
| Tensile Properties | D 638 |
| Brittleness Temperature (°C.) | D 746 |

The materials were blended in various ratios and checked for brittleness temperature using ASTM test method D 746. The results showed a surprising synergism for a mixture of PVC with chlorosulfonated and chlorinated polyethylene when utilized as a combination in place of chlorinated polyethylene alone or chlorosulfonated polyethylene alone. Test results are set forth in Table 1 which compares all 6 examples carried out.

TABLE 1

| Example | % Polymer Ratio PVC/CPE/CSM | Brittleness Temperature (°C.) |
|---|---|---|
| 1 | 96/2/2 | −13 |
| 2 | 85/7.5/7.5 | −30 |
| 3 | 85/15/0 | −25 |
| 4 | 85/0/15 | −23 |
| 5 | 70/15/15 | −40 |
| 6 | 50/25/25 | −58 |

Examination of the comparison of the various blends shows a distinct synergism in brittleness temperature for mixtures of chlorinated polyethylene and chlorosulfonated polyethylene. The synergism is shown by Example 2, when compared with examples 3 and 4 wherein the non-PVC portion of the blend was replaced by chlorinated polyethylene alone or chlorosulfonated polyethylene alone.

EXAMPLES 7-10

| PVC | 50 |
|---|---|
| CPL (as shown) | 37.5 |
| CSM (as shown) | 12.5 |
| Dibasic lead phthalate | 3.5 |
| Lubricants | 2.0 |

In examples 7 and 8 Hypalon ® 40 CSM (trademark of and sold by E. I. DuPont de Nemours & Company) having a density of 0.96, a sulfur content of 1.0 and a chlorine content of 34.5 weight percent was tested in the base formula with two different chlorinated polyethylenes, one having 35% chlorine (LD963, trademark of and sold by E. I. DuPont de Nemours & Company), and chlorinated polyethylene having 43% chlorine content by weight (HPR 5857, trademark of and sold by E. I. DuPont de Nemours & Company).

Examples 9 and 10 were carried out utilizing 0.92 density chlorosulfonated polyethylene (Hypalon ® 30 CSM, trademark of and sold by E. I. DuPont de Nemours & Company) having sulfur content of 1.1 and a chlorine of 43% by weight, and used the same two different chlorinated polyethylenes described for Examples 7 and 8.

An examination of the data shows that simply changing the density of the polyethylene from which the chlorosulfonated polyethylene is made from a high density (0.96) to a low density (0.92) has an outstanding effect upon the brittleness temperature at which low temperature impact failure occurs.

TABLE 2

Density Effects on Low Temperature Brittleness

|  | Shore D Hardness | Specific Gravity | Tensile Strength (psi) | Brittleness Temperature (°C.) |
|---|---|---|---|---|
| 7 | 45 | 1.29 | 1030 | −56 |
| 8 | 48 | 1.32 | 1680 | −54 |
| 9 | 50 | 1.31 | 1370 | −23 |
| 10 | 55 | 1.33 | 2130 | −20 |

EXAMPLES 11, 12, 13 and 14

Utilizing 3.75 parts per hundred polymer dibasic lead phthlate and 2.0 part lubricants in the same proportion as set forth in Examples 7-10, varying polymer ratios were tested for various physical properties. The results are set forth in Table 3.

TABLE 3

| Example | 11 | 12 | 13 | 14 |
|---|---|---|---|---|
| Polymer Ratios: | | | | |
| PVC (wt % of polymer) | 50.0 | 60.0 | 66.7 | 57.1 |
| CPE (wt % of polymer) | 25.0 | 20.0 | 16.8 | 28.6 |
| CSM (wt % of polymer) | 25.0 | 20.0 | 16.8 | 14.3 |
| Physical Properties: | | | | |
| Hardness (Shore "D" durometer initial) | 47 | 57 | 66 | 55 |
| Specific Gravity | 1.31 | 1.33 | 1.34 | 1.32 |
| Tensile Properties: | | | | |
| Tensile Strength (psi) | 1330 | 2350 | 3360 | 2390 |
| 100% Modulus (psi) | 1320 | 2350 | 3360 | 2270 |
| % Elongation | 230 | 1300 | 110 | 170 |
| Brittleness Temperature (°C.) | −54 | −48 | −45 | −52 |

EXAMPLES 15-17

The effect of molecular weight of the base polyethylene (density greater than 0.94) in CPE/CSM as indicated by $MI_{20}$ values as determined using ASTM D 3364 was tested using both the test formula and procedure described in Examples 1-6, and the polymer ratios described in Example 6. The PVC used was the same in all examples. $MI_{20}$ values for CPE/CSM were as follows:

| | $MI_{20}$ VALUES | |
| Example | CPF | CSM |
| --- | --- | --- |
| 15 | 165 | 4.75 |
| 16 | .024 | 4.75 |
| 17 | 3.7 | .024 |
| 18 | 3.7 | 165 |
| 19 | 3.7 | 4.75 |

The test results for these various molecular weights are used are set forth in Table 4.

TABLE 4

| Ex | Tensile Strength (psi) | Shore D Hardness | Brittleness Temperature (°C.) |
| --- | --- | --- | --- |
| 15 | 1550 | 49 | −32 |
| 16 | 2960 | 57 | −55 |
| 17 | 2370 | 55 | −64 |
| 18 | 1270 | 50 | −38 |
| 19 | 2280 | 50 | −58 |

While certain embodiments and details have been shown for the purpose of illustrating this invention, it will be apparent to those skilled in this art that various changes and modifications may be made herein without departing from the spirit or scope of the invention.

I claim:

1. A method for improving the low temperature brittle point properties of non-rigid poly(vinyl chloride) compositions containing from 40 to 85 parts PVC comprising adding to said poly(vinyl chloride) compositions from 1 to 50 parts of chlorosulfonated polyethylene, wherein said base polyethylene has a density of at least 0.94 and from 1 to 50 parts of chlorinated polyethylene, wherein said base polyethylene has a density of at least 0.94, and wherein the total amount of chlorinated polyethylene and chlorosulfonated polyethylene does not exceed 60% by weight of the polymer present.

2. A method as described in claim 1 wherein the total amount of PVC present ranges from 50 to 70 parts.

3. A method as described in claim 2 wherein substantially equal amounts of chlorosulfonated polyethylene and chlorinated polyethylene are added.

4. A method as described in claim 3 wherein the molecular weight of the polyethylene in chlorinated polyethylene and chlorosulfonated polyethylene is less than 100 as determined by $MI_{20}$.

5. A method as described in claim 4 wherein the chlorine content of the chlorinated polyethylene ranges from about 35 to about 50% by weight.

6. A method as described in claim 5 wherein the chlorine content of the chlorosulfonated polyethylene ranges from about 20 to about 50% by weight and the sulfur content is at least about 0.1% by weight.

7. A method as described in claim 6 wherein each of the chlorinated polyethylene and chlorosulfonated polyethylene is present in amounts ranging from about 2 to about 30 parts based on the total resin present.

8. A method as described in claim 7 wherein the chlorinated polyethylene and chlorosulfonated polyethylene are present in amounts ranging from about 5 to about 25 parts based upon the total resin present.

* * * * *